(12) United States Patent
Hoppe et al.

(10) Patent No.: US 11,225,132 B2
(45) Date of Patent: Jan. 18, 2022

(54) HYBRID MODULE WITH INTEGRATED SENSOR DEVICE, AND HYBRID POWERTRAIN COMPRISING A HYBRID MODULE

(71) Applicant: Schaeffler Technologies AG & Co. KG, Herzogenaurach (DE)

(72) Inventors: Marcus Hoppe, Achern (DE); Torsten Pieper, Weingarten (DE); Martin Vornehm, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 244 days.

(21) Appl. No.: 16/479,994

(22) PCT Filed: Feb. 6, 2018

(86) PCT No.: PCT/DE2018/100094
§ 371 (c)(1),
(2) Date: Jul. 23, 2019

(87) PCT Pub. No.: WO2018/161990
PCT Pub. Date: Sep. 13, 2018

(65) Prior Publication Data
US 2019/0389300 A1    Dec. 26, 2019

(30) Foreign Application Priority Data

Mar. 6, 2017 (DE) .......................... 102017104562.7
Dec. 8, 2017 (DE) .......................... 102017129269.1

(51) Int. Cl.
*B60K 6/48* (2007.10)
*H02K 11/33* (2016.01)
(Continued)

(52) U.S. Cl.
CPC .................. *B60K 6/48* (2013.01); *B60K 6/30* (2013.01); *B60K 6/387* (2013.01); *B60K 6/405* (2013.01);
(Continued)

(58) Field of Classification Search
CPC ........... B60K 6/405; B60K 6/387; B60K 6/48
See application file for complete search history.

(56) References Cited

U.S. PATENT DOCUMENTS

| | | | |
|---|---|---|---|
| 2005/0206349 A1* | 9/2005 | Raszkowski | H02K 11/33 322/15 |
| 2010/0069192 A1 | 3/2010 | Tabata | |
| 2011/0239818 A1 | 10/2011 | Kasuya et al. | |

FOREIGN PATENT DOCUMENTS

| | | |
|---|---|---|
| DE | 10044232 A1 | 3/2001 |
| EP | 2199136 A1 | 6/2010 |

(Continued)

*Primary Examiner* — James A Shriver, II
*Assistant Examiner* — James J Triggs (57) ABSTRACT

A hybrid module for a powertrain of a motor vehicle includes a rotational axis defining an axial direction, a housing, first and second support bearings, an intermediate shaft, a separating clutch, and a sensor device. The second support bearing is arranged at a distance from the first support bearing in the axial direction to form a receiving space therebetween. The intermediate shaft is mounted by the first support bearing and the second support bearing to be rotatable relative to the housing about the rotational axis. The separating clutch has a rotary component arranged to be coupled to an electric machine, and connected for conjoint rotation with the intermediate shaft. The sensor device includes at least one part arranged in the receiving space.

20 Claims, 5 Drawing Sheets

(51) Int. Cl.
  *B60K 6/30* (2007.10)
  *B60K 6/387* (2007.10)
  *B60K 6/405* (2007.10)
  *F16D 13/52* (2006.01)
  *F16F 15/14* (2006.01)

(52) U.S. Cl.
  CPC .......... *F16D 13/52* (2013.01); *F16F 15/1457* (2013.01); *H02K 11/33* (2016.01); *B60K 2006/4825* (2013.01); *B60Y 2200/92* (2013.01); *B60Y 2400/48* (2013.01)

(56) References Cited

FOREIGN PATENT DOCUMENTS

| | | | |
|---|---|---|---|
| JP | 2007259601 A | 10/2007 | |
| JP | 2011213189 A | 10/2011 | |
| WO | 2015015276 A1 | 2/2015 | |
| WO | 2016070878 A1 | 5/2016 | |

\* cited by examiner

HYBRID MODULE WITH INTEGRATED SENSOR DEVICE, AND HYBRID POWERTRAIN COMPRISING A HYBRID MODULE

CROSS-REFERENCE TO RELATED APPLICATIONS

This application is the United States National Phase of PCT Appln. No. PCT/DE2018/100094 filed Feb. 6, 2018, which claims priority to German Application Nos. DE102017104562.7 filed Mar. 6, 2017 and DE102017129269.1 filed Dec. 8, 2017, the entire disclosures of which are incorporated by reference herein.

TECHNICAL FIELD

The disclosure relates to a hybrid module for a (hybrid) powertrain of a motor vehicle, such as a passenger car, truck, bus or some other commercial vehicle, having a housing, a separating clutch, and an intermediate shaft. A separating clutch rotating component, which is coupled to or can be coupled to an electric machine, is connected for conjoint rotation to the intermediate shaft, and the intermediate shaft is mounted by means of two support bearings in such a way as to be rotatable about a rotational axis relative to the housing. Moreover, the disclosure relates to a hybrid powertrain having the hybrid module.

BACKGROUND

Prior art of the type in question is already sufficiently well known. WO 2016/070 878 A1, for example, discloses a hybrid module for a powertrain of a motor vehicle, having an electric drive motor, which is integrated into the hybrid module.

Moreover, there is a known practice of monitoring the operating states of the electric machines of these hybrid modules. In principle, it is possible for this purpose to use various sensor devices in order, for example, to detect the rotational speed or a position of a rotor of the electric machine.

However, one disadvantage of known hybrid modules is that a relatively large amount of installation space is occupied by the sensors of the sensor devices. This disadvantage is aggravated by the previously implemented arrangement of the sensor devices.

SUMMARY

Example embodiments broadly comprise support bearings arranged at a distance from each other in the axial direction, i.e. along the rotational axis, such that a receiving space is formed axially between them, wherein at least one part of a sensor device is arranged/accommodated/positioned in the receiving space. Through the skillful use of this installation space, which is available in any case, existing hybrid modules without a sensor device can be adapted easily without necessarily having to make available additional installation space. A compact design of a hybrid module, which can nevertheless be adequately monitored, is thus created.

In this respect, the housing may have a partition wall extending in a radial direction, and the two support bearings may be mounted/held on a radial inner side of the partition wall. For example, a bearing outer ring of the respective support bearing is in each case mounted/held on the radial inner side of the partition wall. The support bearings are thereby mounted particularly firmly.

The partition wall may have a sleeve region, which is arranged radially to the inside of a plurality of friction elements of the separating clutch. The support bearings are mounted (e.g. directly) on a radial inner side of the sleeve region. The sleeve region may be connected to the inside, in a radial direction, of a radially extending disk region of the partition wall. The disk region per se is arranged axially offset relative to the separating clutch/to friction elements of the separating clutch. Utilization of the installation space is thereby further optimized. The support bearings may be arranged directly or indirectly on a radial outer side of the intermediate shaft, which is designed as a hollow shaft or a solid shaft.

As regards the sensor device, it may include at least one sensor, or a plurality of sensors, which sensor/s is/are arranged in the receiving space. This keeps the structure of the sensor device particularly simple. The at least one sensor may be designed to detect a rotational speed (/angular speed), a temperature, a torque and/or a position, e.g. an angular position. The sensor may be designed as a resolver. A sensor of particularly compact design is thereby integrated into the receiving space. The at least one sensor is connected/coupled (for data transmission) to an evaluation unit of the sensor device by means of a wireless link or, as a further preference, by means of a wired link.

According to an example embodiment, a plurality of sensors in the form of temperature sensors of the sensor device are provided in the receiving space. In this case, each temperature sensor may make contact with a bearing ring of one of the support bearings, with the result that it detects the temperature of the respective bearing ring. According to another example embodiment, the at least one sensor is designed as a rotational speed sensor/rotation angle sensor, e.g. in the form of a resolver. The rotational speed sensor/rotation angle sensor is connected in a fixed manner to the housing and interacts with a transmitter connected for conjoint rotation to the intermediate shaft.

In an example embodiment, the support bearings may have different diameters and, may be arranged on different steps/offsets of the intermediate shaft. If a slave cylinder used to actuate the separating clutch, e.g. in the form of a concentric slave cylinder (CSC), is positioned radially between the support bearings and a plurality of friction elements of the separating clutch, the existing installation space is used even more completely.

Moreover, the disclosure relates to a hybrid powertrain for a motor vehicle, having the hybrid module according to the disclosure in accordance with at least one of the embodiments described above. In other words, according to the disclosure, sensors (sensor device) are integrated into a hybrid module, which may be designed as a P2 hybrid system. According to the disclosure, a sensor system (sensor device; preferably for detecting a speed/rotational speed, temperature, torque, position or the like) is arranged between two support bearings of an intermediate shaft.

BRIEF DESCRIPTION OF THE DRAWINGS

The disclosure is now described in greater detail below by means of figures in combination with different illustrative embodiments. In the drawings.

DETAILED DESCRIPTION

The figures are of a purely schematic nature and serve only to aid understanding of the invention. Identical elements are provided with the same reference signs. Moreover, the different features of the various illustrative embodiments can be combined freely with one another. As regards the different illustrative embodiments described in greater detail below, it should be noted that, in principle, all the illustrative embodiments are constructed and function in accordance with the first illustrative embodiment and therefore, for the sake of brevity, only the differences with respect to the first illustrative embodiment are described.

Figure 1:
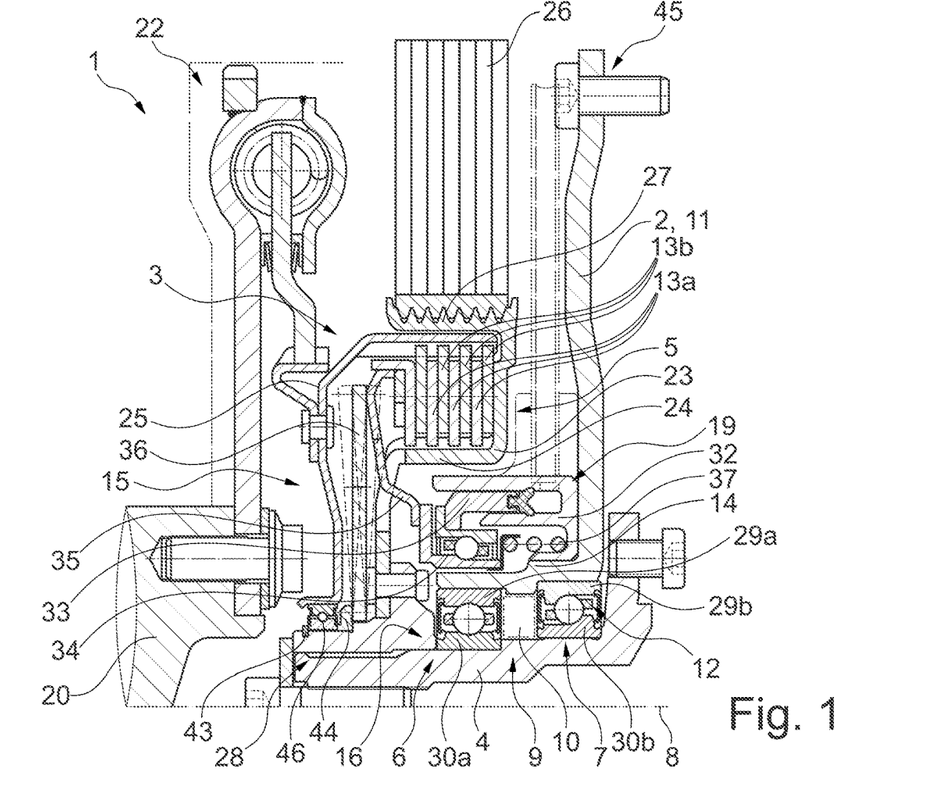
FIG. 1 shows a longitudinal section through a hybrid module according to the disclosure in accordance with a first illustrative embodiment where the hybrid module is equipped with an electric motor arranged parallel to an axis of rotation of a separating clutch, the internal structure of the hybrid module can be seen, and an existing sensor device of the hybrid module is illustrated schematically.

In connection with FIG. 1, the structure of the hybrid module 1 according to the disclosure, in accordance with a first illustrative embodiment, is particularly clearly visible. In operation, the hybrid module 1 is part of a hybrid powertrain of a motor vehicle. The hybrid module 1 may be inserted between an output shaft 20 of an internal combustion engine and a transmission, when viewed along the torque transmission path. In typical fashion, the hybrid module 1 has a clutch device including at least one component clutch, or a plurality of component clutches, of which only one (first) separating clutch 3 is illustrated, for the sake of clarity. The (first) separating clutch 3 is used to selectively couple the output shaft 20 to an intermediate shaft 4 of the hybrid module 1 for conjoint rotation. The hybrid module 1 also has, in typical fashion, an electric machine/electric motor. In this embodiment, the electric machine is arranged axially parallel, i.e. with an axis of rotation of its rotor parallel to an axis of rotation 8 of the intermediate shaft 4/of the output shaft 20 (crankshaft). In this illustrative embodiment, the electric machine can be regarded as a component of the hybrid module 1 but, in principle, can also be regarded as a component separate from the hybrid module 1.

On a side facing the output shaft 20, the hybrid module 1 of the first illustrative embodiment has a torsional vibration damper in the form of a dual mass flywheel 22. In FIG. 1, the dual mass flywheel 22 is already connected for conjoint rotation to the output shaft 20. The dual mass flywheel 22 is connected on the input side to the output shaft 20. On the output side, the dual mass flywheel 22 is connected for conjoint rotation to a rotary component 15, referred to below as the second rotary component 15, of the first separating clutch 3.

The first separating clutch 3 is embodied as a friction clutch. In this illustrative embodiment, the first separating clutch 3 is embodied as a dry clutch but, in principle, can also be embodied as a wet clutch. A first rotary component 5 of the first separating clutch 3, said component being provided adjacent to the second rotary component 15, interacts via a plurality of friction elements 13a and 13b with the second rotary component 15. In a coupled position of the first separating clutch 3, the two rotary components 5, 15 are typically connected frictionally to one another by means of their friction elements 13a, 13b. In a decoupled position of the first separating clutch 3, the friction elements 13a and 13b and thus the rotary components 5, 15 are arranged in such a way that they can rotate freely relative to one another. The two rotary components 5, 15 are arranged in such a way that they can rotate about a central axis of rotation 8 of the separating clutch 3/hybrid module 1.

For example, the first separating clutch 3 is configured as a multiplate friction clutch. Thus, each rotary component 5, 15 has a plurality of friction elements 13a, 13b in the form of friction plates. The first rotary component 5 has a first carrier 23, designed as an inner carrier/inner plate carrier. A plurality of first friction elements 13a is mounted for conjoint rotation on this first carrier 23, namely on a sleeve-shaped supporting region 24 of the first carrier 23. The first friction elements 13a are furthermore mounted on the supporting region 24 of the first carrier 23 in such a way as to be movable relative to one another in the axial direction. For this purpose, the first carrier 23 has formed teeth, on which the first friction elements 13a are mounted for conjoint rotation and in a manner which allows axial movement. A second friction element 13b of the second rotary component 15 is in each case arranged between two adjacent first friction elements 13a. The second rotary component 15 has a second area 25 in the form of an outer carrier/outer plate carrier, which holds the second friction elements 13b for conjoint rotation and in a manner which allows them to move axially relative to one another.

The rotor (not illustrated specifically here, for the sake of clarity) of the electric machine is furthermore coupled in driving fashion to the first rotary component 5 of the separating clutch 3. For this purpose, the rotor shaft of the rotor is coupled to the first rotary component 5 by means of a traction means 26 (in this case a belt but, as an alternative, could also be a chain etc.). The first rotary component 5 has a traction means mounting region 27, which receives the traction means 26 in positive and/or frictional engagement. The use of chains has proven useful at this point, for example. The mounting region 27 is arranged radially to the outside of the supporting region 24 and of the friction elements 13a, 13b. The first carrier 23 thus also forms a rotor/belt pulley carrier.

By means of its first carrier 23, the first rotary component 5 is rotationally connected to an intermediate shaft 4 which, in turn, is mounted so as to be rotatable about the axis of rotation 8. In this illustrative embodiment, serrations 28 are used to establish the connection for conjoint rotation between the first carrier 23 and the intermediate shaft 4. In operation, the intermediate shaft 4 serves in typical fashion to connect the first rotary component 5 to a further component clutch of the clutch device, e.g. to a component clutch of a double clutch of the hybrid module 1.

The intermediate shaft 4 is mounted in such a way as to be rotatable relative to a housing 2 of the hybrid module 1. For this purpose, two support bearings 6, 7 arranged spaced apart relative to one another along the axis of rotation 8/in the axial direction are provided. A first support bearing 6 is arranged closer to the dual mass flywheel 22 in the axial direction than a second support bearing 7. Both support bearings 6, 7 are embodied as ball bearings. The second support bearing 7 is embodied as an angular contact ball bearing. The two support bearings 6, 7 are mounted on a partition wall 11 of the housing 2. For this purpose, the partition wall 11 forms a sleeve region 14, which extends in the axial direction and on the radial inner side 12 of which the two support bearings 6, 7 are mounted. Each support bearing 6, 7 is held by means of a bearing outer ring 29*a*, 29*b* on this sleeve region 14/on the partition wall 11.

The support bearings 6, 7 have different diameters. Consequently, the sleeve region 14 is of stepped design. The first support bearing 6 is mounted by means of the bearing outer ring 29*a* thereof on a first step; the second support bearing 7 is mounted by means of the bearing outer ring 29*b* thereof on a second step, which is widened radially outward relative to said first step. In corresponding fashion, the support bearings 6, 7 are also mounted on two different steps of the intermediate shaft 4. A first step of the intermediate shaft 4 serves to receive the first support bearing 6/a bearing inner ring 30*a* of the first support bearing 6 and is of smaller dimensions radially than a second step, which serves to receive the second support bearing 7/a bearing inner ring 30*b* of the second support bearing 7.

Figure 2:
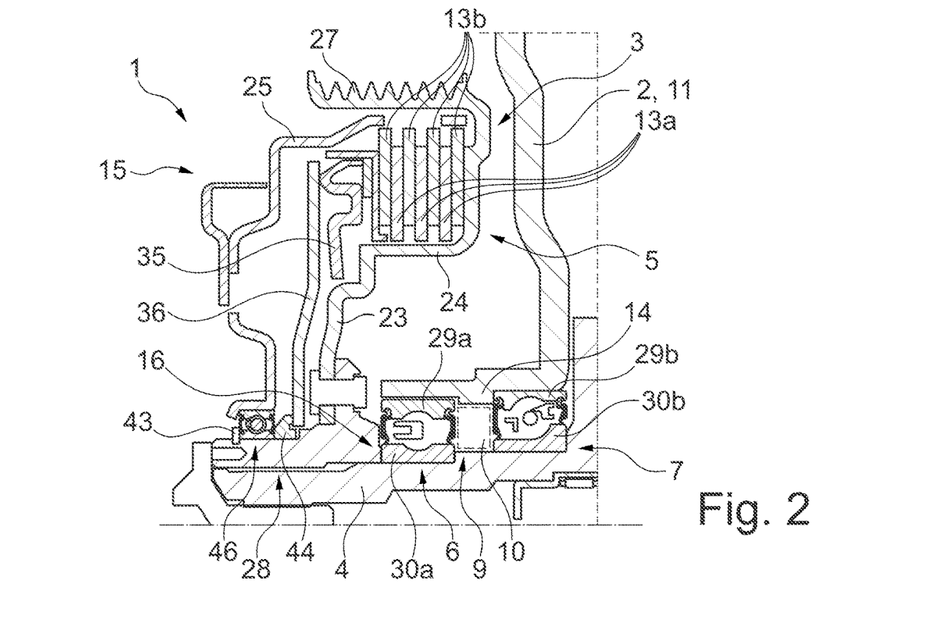
FIG. 2 shows a longitudinal section through the hybrid module shown in FIG. 1 in the region of the separating clutch, of an intermediate shaft and of a receiving space, formed between two support bearings, for receiving the sensor device.

According to the disclosure, a receiving space 9 is now formed between the two support bearings 6, 7 in the axial direction to receive components of a sensor device 10. This is also particularly clearly visible in FIG. 2. In this context, different sensors 17 of the sensor device 10 for mounting in this receiving space 9 are illustrated in connection with FIGS. 3 to 5.

Figure 3:
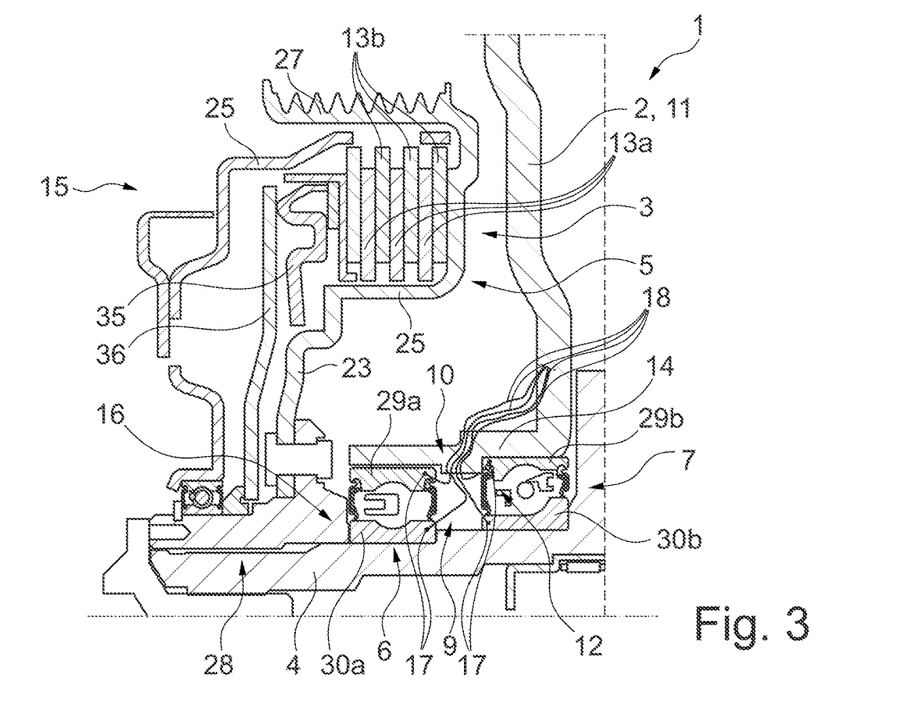
FIG. 3 shows a longitudinal section through the partially depicted hybrid module, similar to FIG. 2, according to a first variant in which the sensor device is equipped with a plurality of temperature sensors.

In FIG. 3, a plurality of sensors 17 of the sensor device 10 are arranged in the receiving space 9. The sensors 17 are each configured as temperature sensors. The sensors 17 are respectively connected to one of the bearing rings 29*a*, 29*b*, 30*a*, 30*b*. Thus, an individual (first) sensor 17 is mounted in contact on the bearing outer ring 29*a* of the first support bearing 6. A further (second) individual sensor 17 is mounted in contact on the bearing outer ring 29*b* of the second support bearing 7. A further (third) sensor 17 is mounted in contact on the bearing inner ring 30*a* of the first support bearing 6. A further (fourth) sensor 17 is mounted in contact on the bearing inner ring 30*b* of the second support bearing 7. In this illustrative embodiment, each sensor 17 is furthermore connected for data transmission and power transmission to an evaluation unit of the sensor device 10 by a wired link, a section of which is indicated here by means of a cable 18. For the sake of clarity, the evaluation unit is not illustrated specifically. The wired link passes through the partition wall 11 in the radial direction and/or at least partially in the axial direction relative to the axis of rotation 8.

Figure 4:
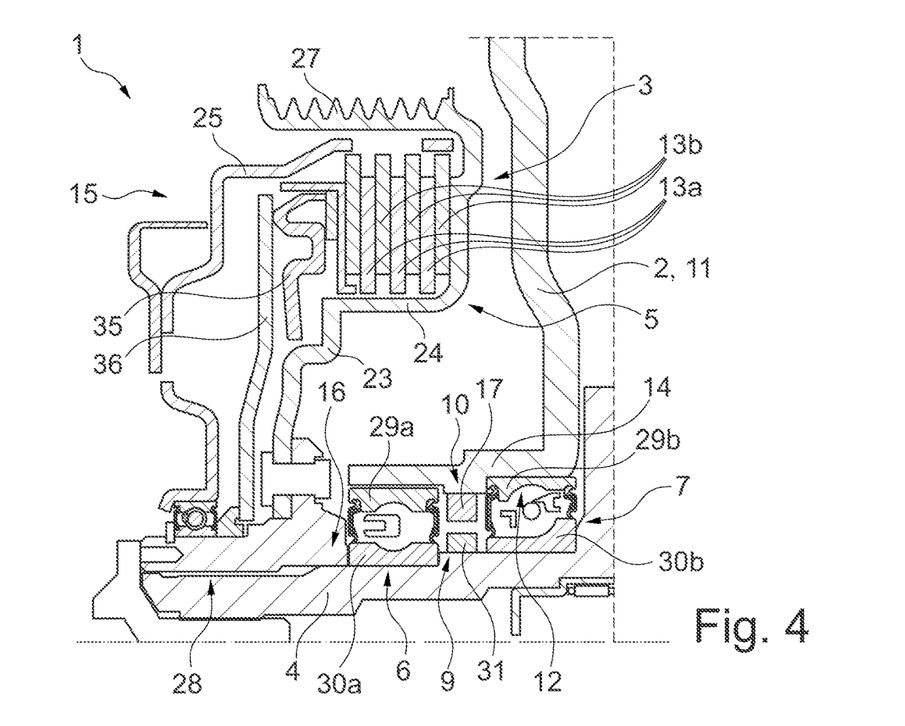
FIG. 4 shows a longitudinal section through the partially depicted hybrid module, similar to FIG. 2, according to a second variant in which the sensor device is equipped with a rotational speed sensor, and the measuring zone of the rotational speed sensor is aligned radially inward.

In FIG. 4, only a single sensor 17 of the sensor device 10 is arranged in the receiving space 9. In FIG. 4, the sensor 17 is configured as a rotational speed sensor. The sensor 17 interacts with a transmitter 31, wherein the transmitter 31 forms a component that can be detected metrologically by the sensor 17. The transmitter 31 is arranged radially to the inside of the sensor 17. The sensor 17 is mounted in a fixed manner on the partition wall 11/housing 2. The measuring zone of the sensor 17 is directed inward in the radial direction toward the transmitter 31. The transmitter 31 is connected for conjoint rotation to the intermediate shaft 4. The transmitter 31 is mounted on an outer side 16 of the intermediate shaft 4. It is thereby possible, in particular, to detect a rotational speed/angular speed of the intermediate shaft 4. The transmitter 31 is furthermore designed as a transmitter wheel. The transmitter 31 thus has a plurality of projections/raised portions distributed around the circumference, which also allow detection of the (angular) position of the intermediate shaft 4 in operation. A rotational speed/angular speed and position of the rotor can also be inferred by virtue of the rotary connection to the rotor.

Figure 5:
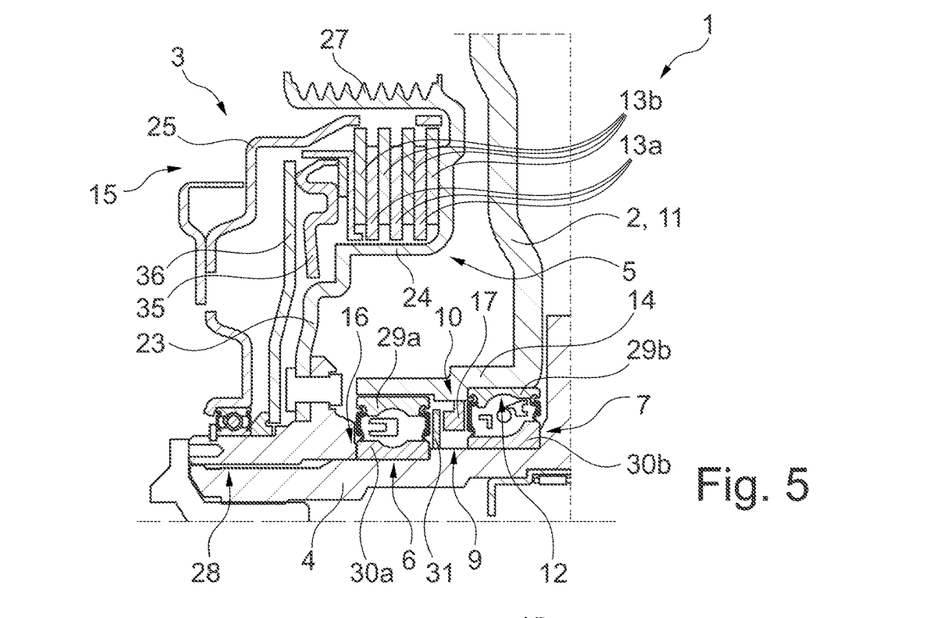
FIG. 5 shows a longitudinal section through the partially depicted hybrid module, similar to FIG. 2, according to a third variant in which the sensor device is designed as a rotational speed sensor and the measuring zone thereof is aligned in an axial direction.

In connection with FIG. 5, as in FIG. 4, a single sensor 17 of the sensor device 10 is implemented in the form of a rotational speed sensor. The sensor 17 of the variant illustrated in FIG. 5 differs from the sensor 17 in the variant illustrated in FIG. 4 in that the measuring zone thereof is aligned in the axial direction. The transmitter 31 projects beyond the sensor 17 in the radial direction in a certain region of overlap, thus enabling the sensor 17, in turn, to detect the raised portions of the transmitter 31 in the form of the transmitter wheel.

As can furthermore be seen in FIG. 1, the first separating clutch 3 can be actuated by means of a slave cylinder 19. The slave cylinder 19 is embodied as a concentric (annular) slave cylinder 19 (CSC). The slave cylinder 19 is mounted in a manner fixed relative to the housing, namely fixed relative to the partition wall 11. The slave cylinder 19 has a cylinder housing 32, which is arranged and secured on a radial outer side of the sleeve region 14. An (annular) piston 33 is mounted movably in the cylinder housing 32. A preloading spring 37 acts on the piston 33 in an axial direction. The piston 33 furthermore interacts with an actuation bearing 34, and this actuation bearing 34, in turn, interacts with a pressure pot 35. Owing to the design of the first separating clutch 3 as a normally closed/normally engaged clutch, the pressure pot 35 is preloaded by a diaphragm spring 36 in such a way that, in an unactuated state of the slave cylinder 19, it forces the first separating clutch 3 into its coupled position by pressing the friction elements 13*a*, 13*b* against one another. The slave cylinder 19 is therefore implemented as a clutch release device/clutch release system. In FIG. 1, the diaphragm spring 36 is illustrated in dashed lines in further pivoted positions. In the region of its pivoting point, the diaphragm spring 36 is connected in a fixed manner axially to/supported in a fixed manner axially on the first rotary component 5. Thus, the diaphragm spring 36 is clamped in the axial direction relative to the first rotary component 5. A modulation spring can optionally also be present in addition.

Figure 6:
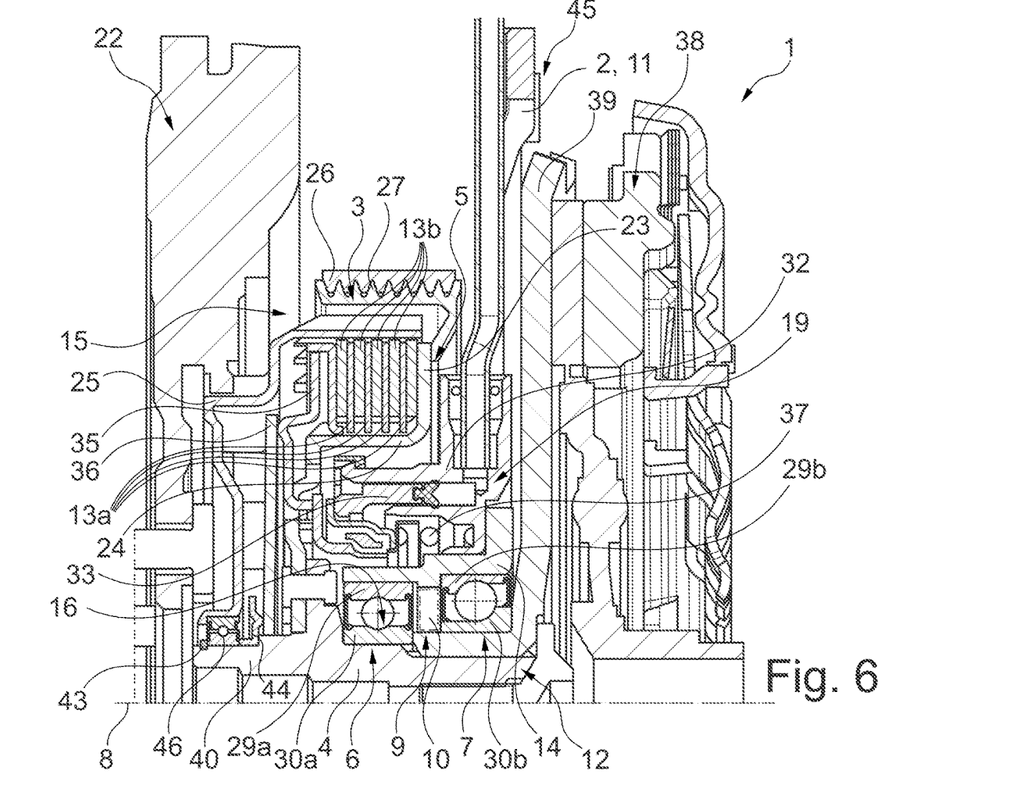
FIG. 6 shows a longitudinal section through a hybrid module according to the disclosure in accordance with a second illustrative embodiment in which the intermediate shaft is of two-part design.
Figure 7:
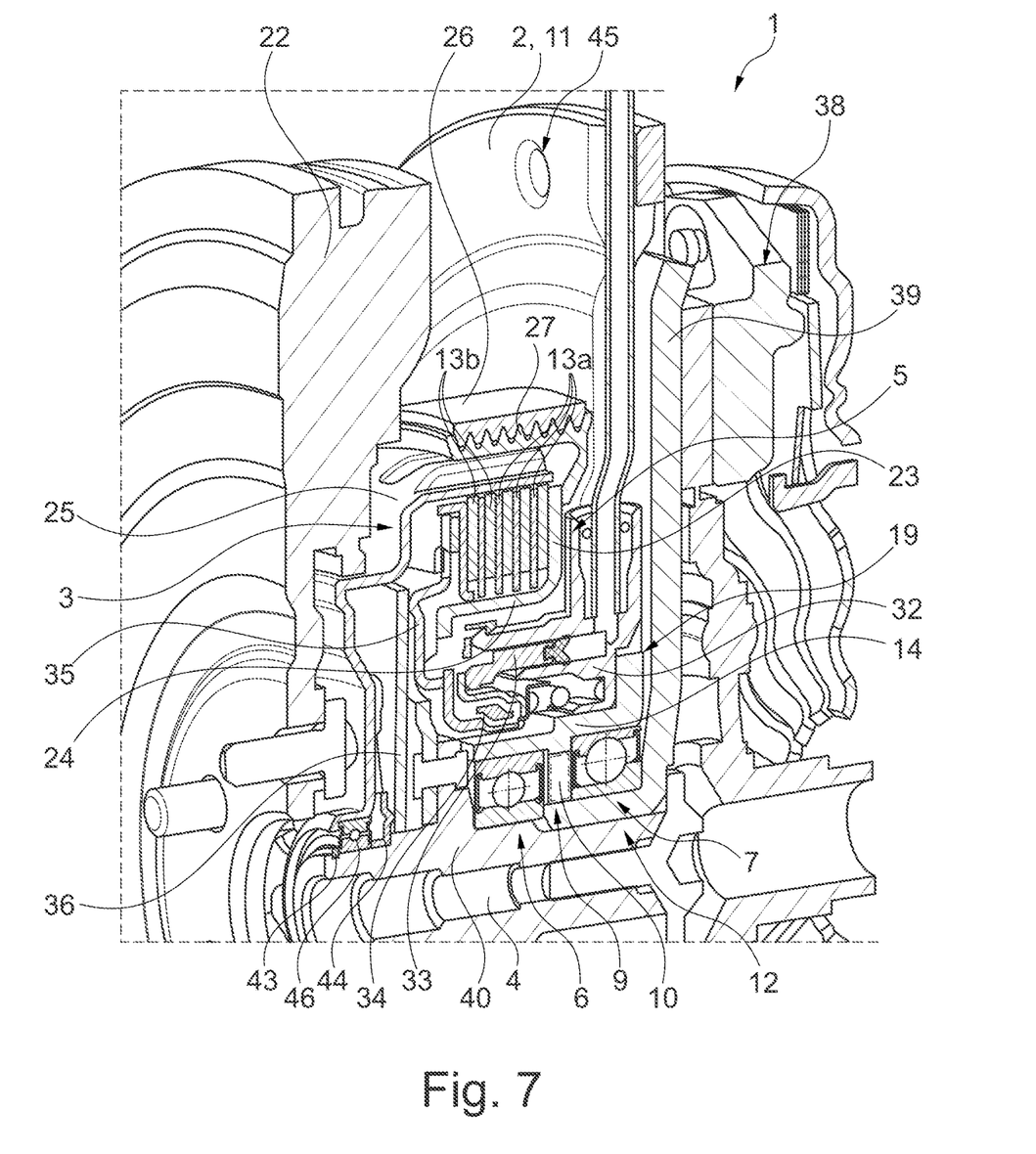
FIG. 7 shows a perspective illustration of the hybrid module of FIG. 6 sectioned longitudinally.

A further, second illustrative embodiment of the hybrid module 1 according to the disclosure is illustrated in connection with FIGS. 6 and 7. As can be seen here, it is also possible, in principle, for the intermediate shaft 4 to be of multipart design. The intermediate shaft 4 helps to form a flywheel/a counterpressure plate 39 of a further clutch 38/component clutch of the clutch device. The counterpressure plate 39 is connected for conjoint rotation to a tubular component/main body 40 of the intermediate shaft 4. Moreover, the torsional vibration damper is here in the form of a single mass flywheel. The first carrier 23 is also connected to the intermediate shaft 4 by means of riveting.

Figure 8:
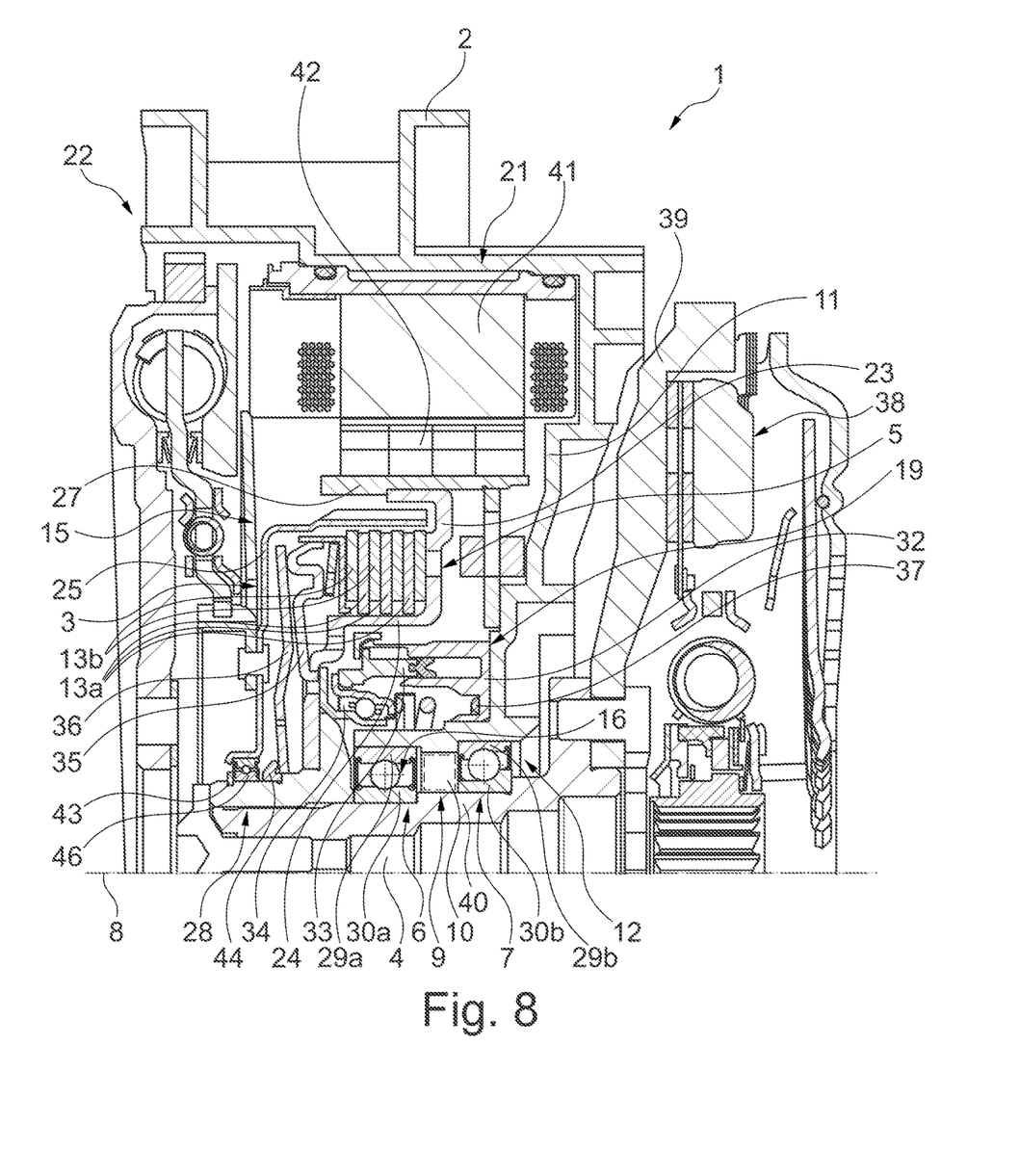
FIG. 8 shows a longitudinal section through a hybrid module according to the disclosure in accordance with a third illustrative embodiment in which the electric machine is now arranged coaxially with the axis of rotation of the separating clutch.

In connection with FIG. 8, it is furthermore also possible to construct the hybrid module 1 in accordance with the coaxial type, rather than with the axially parallel type. In this illustrative embodiment, the electric machine 21 is incorporated directly into the housing 2 of the hybrid module 1. In particular, a stator 41 and the rotor 42, interacting therewith, of the electric machine 21 are integrated into the housing 2. The rotor 42 is mounted directly on the mounting region 27 of the first carrier 23. The first carrier 23 thus directly forms a rotor carrier. Moreover, the intermediate shaft 4 is of multipart design, as in FIGS. 6 and 7. The counterpressure plate 39 is, in turn, connected for conjoint rotation to the main body 40. Moreover, the sensor 17 accommodated in the receiving space 9 is designed as a resolver.

In other words, according to the disclosure, the installation space (receiving space 9) between the support bearings 6, 7 of the intermediate shaft 4 is used for the measuring sensors (sensor device 10). This installation space 9 has the advantage that a very wide variety of sensors can be installed at this point. These can be sensors 17 for rotational speed, temperature (e.g. for monitoring bearings), torque, position (resolver) or the like, for example. By virtue of the installation position of the sensors 10, it is possible to install both wireless sensors 10 and sensors 10 with cables 18 since these can be routed "to the outside" via the partition wall 11. Both radially and axially operating systems are conceivable. Moreover, the installation location (receiving space 9) is protected from contamination. In the present case, one may highlight the possibility, in particular, of relocating the resolver (sensor 17) for a coaxially arranged electric machine 21, which hitherto has occupied a large amount of installation space in an unfavorable location, to the stated installation location 9. The installation position for the measuring sensors 10 is suitable both for coaxially arranged hybrid modules 1 and for axially parallel arrangements. Moreover, it is equally suitable for 48V and for high voltage systems.

In principle, a K0 clutch/engine separating clutch (first separating clutch 3) which is normally closed is used as an initial basis in an example illustrative embodiment. The embodiment of this clutch 3 as a dry multiplate clutch or wet clutch is correspondingly possible. The electric machine is arranged in an axially parallel manner and is coupled to the K0 3 by a belt drive, chain drive, etc., for example. A rotor/belt pulley carrier (first carrier 23) of the K0 3 is at the same time embodied as an inner plate carrier. The carrier 23 may be designed with formed plate teeth. The plate pack (totality of first and second friction elements 13a, 13b) of the K0 3 is preloaded by means of a diaphragm spring 36, optionally including a modulation spring. The K0 3 may be actuated by means of an annular piston CSC (slave cylinder 19). There may be a bearing preloading spring therein. A coaxial electric machine 21 is also possible in corresponding fashion. The DMF (dual mass flywheel 22) may have a flange with or without a clamping device.

Reference sign 25 denotes an outer plate carrier embodied as a single part. Reference sign 2 denotes a retaining ring 43 for supporting a bearing 46 of the outer plate carrier 25 and a diaphragm spring support plate 44. Reference sign 39 denotes a flywheel, which is formed integrally with a flange and teeth for connection to a shaft (intermediate shaft 4). Reference sign 36 denotes a diaphragm spring, which has a diameter smaller than an inside diameter of driver teeth. Reference sign 4 denotes a shaft, which can be embodied as a hollow shaft or a solid shaft. Reference sign 11 denotes a partition wall, which has formed apertures 45 with a thread for screwing to a housing 2.

REFERENCE NUMERALS 1 hybrid module
2 housing
3 first separating clutch
4 intermediate shaft
5 first rotary component
6 first support bearing
7 second support bearing
8 axis of rotation
9 receiving space
10 sensor device
11 partition wall
12 inner side of the partition wall
13a first friction element
13b second friction element
14 sleeve region
15 second rotary component
16 outer side of the intermediate shaft
17 sensor
18 cable
19 slave cylinder
20 output shaft
21 electric machine
22 dual mass flywheel
23 first carrier
24 supporting region
25 second carrier
26 traction means
27 mounting region
28 serrations
29a bearing outer ring of the first support bearing
29b bearing outer ring of the second support bearing
30a bearing inner ring of the first support bearing
30b bearing inner ring of the second support bearing
31 transmitter
32 cylinder housing
33 piston
34 actuation bearing
35 pressure pot
36 diaphragm spring
37 preloading spring
38 clutch
39 counterpressure plate
40 main body
41 stator
42 rotor
43 retaining ring
44 support plate
45 formed aperture
46 bearing

The invention claimed is:

1. A hybrid module for a powertrain of a motor vehicle, comprising:
a rotational axis defining an axial direction;
a housing comprising a partition wall extending in a radial direction;
a first support bearing mounted on a radial inner side of the partition wall;
a second support bearing mounted on the radial inner side of the partition wall and arranged at a distance from the first support bearing in the axial direction to form a receiving space therebetween;

an intermediate shaft mounted by the first support bearing and the second support bearing to be rotatable relative to the housing about the rotational axis;
a separating clutch comprising
a rotary component:
arranged to be coupled to an electric machine; and
connected for conjoint rotation with the intermediate shaft; and
a sensor device comprising at least one part arranged in the receiving space.

2. The hybrid module of claim 1, wherein:
the separating clutch further comprises a plurality of friction elements;
the partition wall comprises a sleeve region arranged radially inside of the plurality of friction elements; and
the first support bearing and the second support bearing are each mounted on a radial inner side of the sleeve region.

3. The hybrid module of claim 1, wherein the first support bearing and the second support bearing are each arranged on a radial outer side of the intermediate shaft.

4. The hybrid module of claim 1 wherein the sensor device comprises at least one sensor arranged in the receiving space.

5. The hybrid module of claim 4, wherein the at least one sensor is designed to detect a rotational speed, a temperature, a torque or a position.

6. The hybrid module of claim 4 further comprising a cable for connecting the at least one sensor to an evaluation unit.

7. The hybrid module of claim 6 wherein the cable passes through the partition wall in the radial direction or the axial direction.

8. The hybrid module of claim 4 wherein the at least one sensor is arranged for wireless connection to an evaluation unit.

9. The hybrid module of claim 1 wherein the first support bearing has a first diameter and the second support bearing has a second diameter, different than the first diameter.

10. The hybrid module of claim 1 further comprising a slave cylinder for actuating the separating clutch, wherein:
the separating clutch comprises a plurality of friction elements; and,
the slave cylinder is positioned radially between at least one of the first support bearing or the second support bearing, and the plurality of friction elements.

11. A hybrid powertrain for a motor vehicle, comprising the hybrid module of claim 1.

12. A hybrid module for a powertrain of a motor vehicle, comprising:
a rotational axis defining an axial direction;
a housing;
a first support bearing;
a second support bearing arranged at a distance from the first support bearing in the axial direction to form a receiving space therebetween;
an intermediate shaft mounted by the first support bearing and the second support bearing to be rotatable relative to the housing about the rotational axis;
a separating clutch comprising
a rotary component:
arranged to be coupled to an electric machine; and
connected for conjoint rotation with the intermediate shaft; and
a sensor device comprising at least one sensor arranged in the receiving space wherein:
the hybrid module further comprises a cable for connecting the at least one sensor to an evaluation unit, or
the at least one sensor is arranged for wireless connection to an evaluation unit.

13. The hybrid module of claim 12 wherein the hybrid module comprises:
the cable; and
a partition wall extending in a radial direction, wherein the cable passes through the partition wall in the radial direction or the axial direction.

14. A hybrid module for a powertrain of a motor vehicle, comprising:
a rotational axis defining an axial direction;
a housing;
a first support bearing with a first diameter;
a second support bearing with a second diameter, different than the first diameter, arranged at a distance from the first support bearing in the axial direction to form a receiving space therebetween;
an intermediate shaft mounted by the first support bearing and the second support bearing to be rotatable relative to the housing about the rotational axis;
a separating clutch comprising
a rotary component:
arranged to be coupled to an electric machine; and
connected for conjoint rotation with the intermediate shaft; and
a sensor device comprising at least one part arranged in the receiving space.

15. The hybrid module of claim 14 wherein:
the housing comprises a partition wall extending in a radial direction; and
the first support bearing and the second support bearing are each mounted on a radial inner side of the partition wall.

16. The hybrid module of claim 15, wherein the first support bearing and the second support bearing are each arranged on a radial outer side of the intermediate shaft.

17. The hybrid module of claim 15 wherein the sensor device comprises at least one sensor arranged in the receiving space.

18. The hybrid module of claim 17, wherein the at least one sensor is designed to detect a rotational speed, a temperature, a torque or a position.

19. A hybrid module for a powertrain of a motor vehicle, comprising:
a rotational axis defining an axial direction;
a housing;
a first support bearing;
a second support bearing arranged at a distance from the first support bearing in the axial direction to form a receiving space therebetween;
an intermediate shaft mounted by the first support bearing and the second support bearing to be rotatable relative to the housing about the rotational axis;
a separating clutch comprising
a rotary component:
arranged to be coupled to an electric machine; and
connected for conjoint rotation with the intermediate shaft, and
a plurality of friction elements;
a sensor device comprising at least one part arranged in the receiving space; and a slave cylinder positioned radially between at least one of the first support bearing or the second support bearing, and the plurality of friction elements, for actuating the separating clutch.

20. The hybrid module of claim 19 wherein:

the hybrid module further comprises a partition wall with a sleeve region arranged radially inside of the plurality of friction elements; and the first support bearing and the second support bearing are each mounted on a radial inner side of the sleeve region.

\* \* \* \* \*